(12) United States Patent
Chen et al.

(10) Patent No.: US 12,291,239 B2
(45) Date of Patent: May 6, 2025

(54) SYSTEM AND METHOD WITH SOTIF SCENE COLLECTION AND SELF-UPDATE MECHANISM

(71) Applicant: Automotive Research & Testing Center, Changhua County (TW)

(72) Inventors: Chien-An Chen, Changhua County (TW); Chih-Wei Chuang, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 280 days.

(21) Appl. No.: 18/059,434

(22) Filed: Nov. 29, 2022

(65) Prior Publication Data
US 2024/0174262 A1    May 30, 2024

(51) Int. Cl.
*B60W 60/00* (2020.01)
*B60W 50/14* (2020.01)

(52) U.S. Cl.
CPC ........ *B60W 60/0018* (2020.02); *B60W 50/14* (2013.01); *B60W 60/0053* (2020.02); *B60W 60/0059* (2020.02); *B60W 2554/4049* (2020.02)

(58) Field of Classification Search
None
See application file for complete search history.

(56) References Cited

U.S. PATENT DOCUMENTS

2024/0278799 A1* 8/2024 Venkataraman ...... B60W 50/14

FOREIGN PATENT DOCUMENTS

| CN | 114764454 A | * | 7/2022 |
| DE | 102018125712 A1 | * | 4/2020 |

OTHER PUBLICATIONS

T. Zhao, E. Yurtsever, J. A. Paulson and G. Rizzoni, "Formal Certification Methods for Automated Vehicle Safety Assessment," in IEEE Transactions on Intelligent Vehicles, vol. 8, No. 1, pp. 232-249, Jan. 2023, doi: 10.1109/TIV.2022.3170517 (Year: 2022).*
English Translation of CN-114764454-A (wherein the paragraph numbers provided on this translation coincide with the given citations within the accompanying Office action) (Year: 2022).*
English Translation of DE-102018125712-A1 (wherein the paragraph numbers provided on this translation coincide with the given citations within the accompanying Office action) (Year: 2020).*

* cited by examiner

*Primary Examiner* — Thomas E Worden
*Assistant Examiner* — Bryant Tang
(74) *Attorney, Agent, or Firm* — CKC & Partners Co., LLC

(57) ABSTRACT

A method with a SOTIF scene collection and a self-update mechanism, which is applied to a vehicle, includes a situation judging step, a scene collecting step, a modifying step, a verifying step, and an updating step. As the situation judging step judges that the sensing control dataset belongs to the accident scene dataset, the sensing control dataset collected by the scene collecting step belongs to a SOTIF scene.

19 Claims, 11 Drawing Sheets

SYSTEM AND METHOD WITH SOTIF SCENE COLLECTION AND SELF-UPDATE MECHANISM

BACKGROUND

Technical Field

The present disclosure relates to a system and a method with a scene collection and a self-update mechanism. More particularly, the present disclosure relates to a system and a method with a SOTIF scene collection and a self-update mechanism.

Description of Related Art

A self-driving system can be generally split into Autonomous Driving System (ADS) and Advanced Driver Assistance Systems (ADAS). A conventional self-driving system only includes an on-line update mold, and the algorithm thereof is based on the artificial neural network technique; hence, in a situation that does not learn from the trailing samples, miss judgments may occur. Moreover, if the driver is taken as a monitor target, wrong behavior will be learned. Furthermore, abnormal phenomenon does not be analyzed to figure out the reason whether is caused by the sensor, the control or the human-miss-operation. Therefore, it is known that the markets lack a system and a method with a SOTIF scene collection and a self-update mechanism that are suitable for the self-driving system, and consider the intervention, the accident scene and include off-line/on-line update mechanism, and the solution thereof becomes a target that the practitioners pursued.

SUMMARY

According to one aspect of the present disclosure, a method with a SOTIF scene collection and a self-update mechanism, which is applied to a vehicle, is provided. The method includes a situation judging step including configuring a self-driving system to judge whether a sensing control dataset generated by a sensor and a controller belongs to one of an unexpected intervention dataset and an accident scene dataset to generate a situation judgment result, a scene collecting step including configuring the self-driving system to collect the sensing control dataset to establish a scene database according to the situation judgment result, a modifying step including configuring the self-driving system to modify an algorithm of the sensor and the controller according to the scene database, a verifying step including configuring one of the self-driving system and a cloud platform to perform a parallel calculation on the sensor and the controller that are modified to generate a verification output command and to compare the verification output command with a driver intervention control command to generate a comparison result, and an updating step including configuring the one of the self-driving system and the cloud platform to update the algorithm of the sensor and the controller according to the comparison result, thereby allowing an updated output command generated by the sensor and the controller that are updated to correspond to the driver intervention control command. As the situation judging step judges that the sensing control dataset belongs to the accident scene dataset, the sensing control dataset collected by the scene collecting step belongs to a SOTIF scene.

According to another aspect of the present disclosure, a system with a SOTIF scene collection and a self-update mechanism, which is applied to a vehicle, is provided. The system includes a self-driving system disposed at the vehicle and including a sensor and a controller. The self-driving system is configured to perform a situation judging step including judging whether a sensing control dataset generated by the sensor and the controller belongs to one of an unexpected intervention dataset and an accident scene dataset to generate a situation judgment result, a scene collecting step including collecting the sensing control dataset to establish a scene database according to the situation judgment result, a modifying step including modifying an algorithm of the sensor and the controller according to the scene database, a verifying step including performing a parallel calculation on the sensor and the controller that are modified to generate a verification output command and comparing the verification output command with a driver intervention control command to generate a comparison result, and an updating step including updating the algorithm of the sensor and the controller according to the comparison result, thereby allowing an updated output command generated by the sensor and the controller that are updated to correspond to the driver intervention control command. As the situation judging step judges that the sensing control dataset belongs to the accident scene dataset, the sensing control dataset collected by the scene collecting step belongs to a SOTIF scene.

According to still another aspect of the present disclosure, a system with a SOTIF scene collection and a self-update mechanism, which is applied to a vehicle, is provided. The system includes a self-driving system disposed at the vehicle and including a sensor and a controller, and a cloud platform signally connected to the self-driving system. The self-driving system and the cloud platform are configured to perform a situation judging step including configuring the self-driving system to judge whether a sensing control dataset generated by the sensor and the controller belongs to one of an unexpected intervention dataset and an accident scene dataset to generate a situation judgment result, a scene collecting step including configuring the self-driving system to collect the sensing control dataset to establish a scene database according to the situation judgment result, a modifying step including configuring the self-driving system to modify an algorithm of the sensor and the controller according to the scene database, a verifying step including configuring one of the self-driving system and the cloud platform to perform a parallel calculation on the sensor and the controller that are modified to generate a verification output command and to compare the verification output command with a driver intervention control command to generate a comparison result, and an updating step including configuring the one of the self-driving system and the cloud platform to update the algorithm of the sensor and the controller according to the comparison result, thereby allowing an updated output command generated by the sensor and the controller that are updated to correspond to the driver intervention control command. As the situation judging step judges that the sensing control dataset belongs to the accident scene dataset, the sensing control dataset collected by the scene collecting step belongs to a SOTIF scene.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to another element, or it can be indirectly disposed on, connected or coupled to another element, that is, intervening elements may be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component. Moreover, the combinations of the elements, the components, the mechanisms and the modules are not well-known, ordinary or conventional combinations, and whether the combinations can be easily completed by the one skilled in the art cannot be judged based on whether the elements, the components, the mechanisms or the module themselves are well-known, ordinary or conventional.

Figure 1:
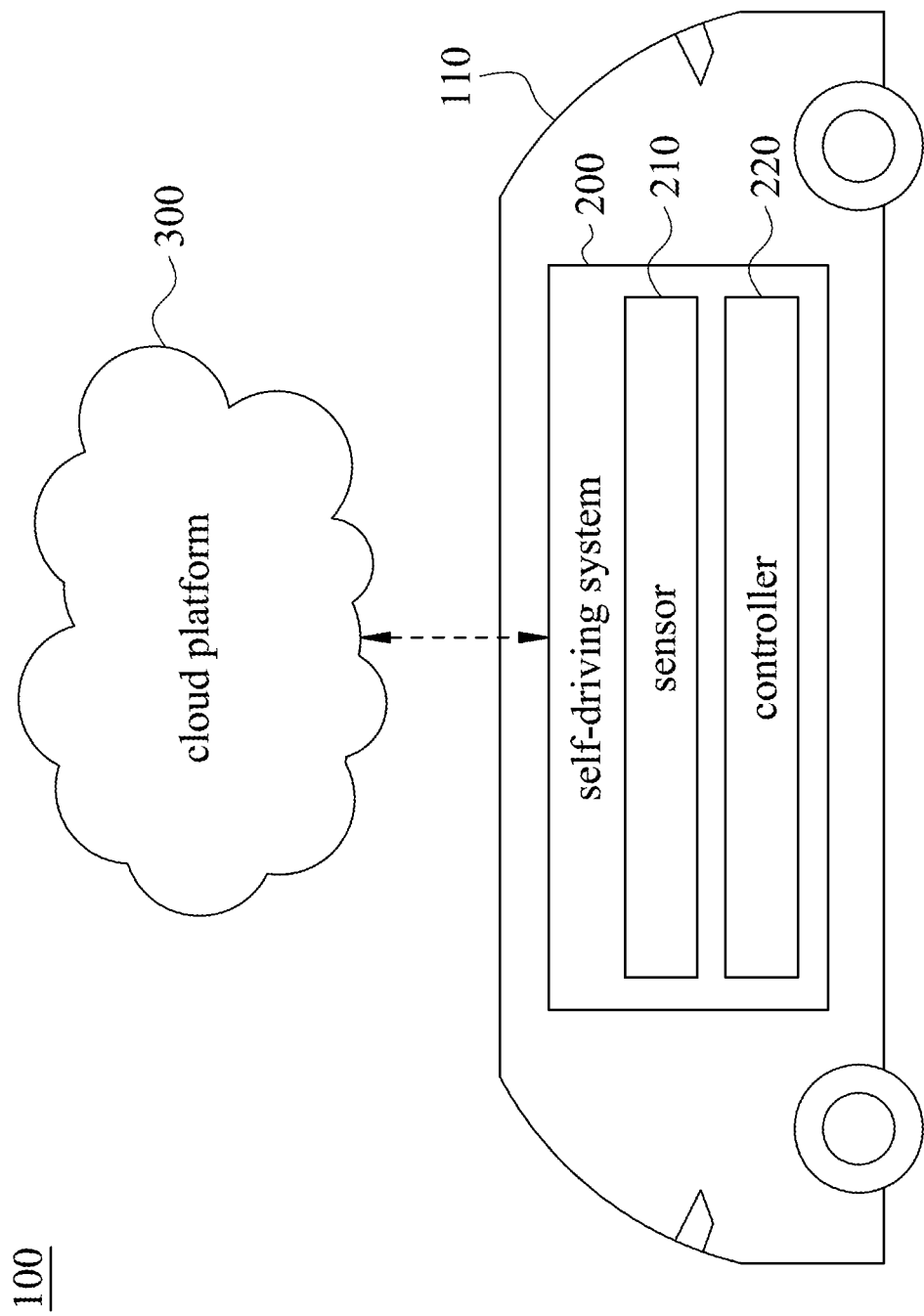
FIG. 1 shows a schematic view of a system with a SOTIF scene collection and a self-update mechanism according to a first embodiment.

FIG. 1 shows a schematic view of a system 100 with a SOTIF scene collection and a self-update mechanism according to a first embodiment. A system 100 with a SOTIF scene collection and a self-update mechanism is applied to a vehicle 110 and includes a self-driving system 200 and a cloud platform (back end) 300. The self-driving system 200 is disposed at the vehicle 110 and includes a sensor 210 and a controller 220. The self-driving system may be an Autonomous Driving System (ADS) or an Advanced Driver Assistance Systems (ADAS). The sensor 210 can be any sensing device employed by the ADS or the ADAS. The cloud platform 300 is signally connected to the self-driving system 200. At first, the self-driving system 200 judges whether a sensing control dataset generated by the sensor 210 and the controller 220 belongs to one of an unexpected intervention dataset and an accident scene dataset to generate a situation judgment result, and collects the sensing control dataset to establish a scene database according to the situation judgment result. Then, the self-driving system 200 modifies an algorithm of the sensor 210 and the controller 220 according to the scene database. Subsequently, one of the self-driving system 200 and the cloud platform 300 performs a parallel calculation on the sensor 210 and the controller 220 that are modified to generate a verification output command and to compare the verification output command with a driver intervention control command to generate a comparison result. Finally, the aforementioned one of the self-driving system 200 and the cloud platform 300 updates the algorithm of the sensor 210 and the controller 220 according to the comparison result, thereby allowing an updated output command generated by the sensor 210 and the controller 220 that are updated to correspond to the driver intervention control command. As the self-driving system 200 judges that the sensing control dataset belongs to the accident scene dataset, the collected sensing control dataset belongs to a SOTIF scene. The sensing control dataset is a collection of the sensing datasets of the sensor 210 and the controlling datasets of the controller 220.

The self-driving system 200 further includes a self-driving processor and a self-driving memory, and the self-driving processor is signally connected to the self-driving memory, the sensor 210 and the controller 220. The cloud platform 300 includes a cloud processor and a cloud memory signally connected to the cloud processor. Any one of the self-driving processor and the cloud processor can be a Processor, a Microprocessor, an Electronic Control Unit (ECU), a computer, a mobile device processor or other processors, but the present disclosure is not limited thereto. Any one of the self-driving processor and the cloud processor can perform a method with the SOTIF scene collection and the self-update mechanism. In addition, any one of the self-driving memory and the cloud memory can be a Random Access Memory (RAM) or other dynamic access memories that can store datasets and instructions provided for any one of the self-driving memory and the cloud memory to perform, but the present disclosure is not limited thereto.

Figure 2:
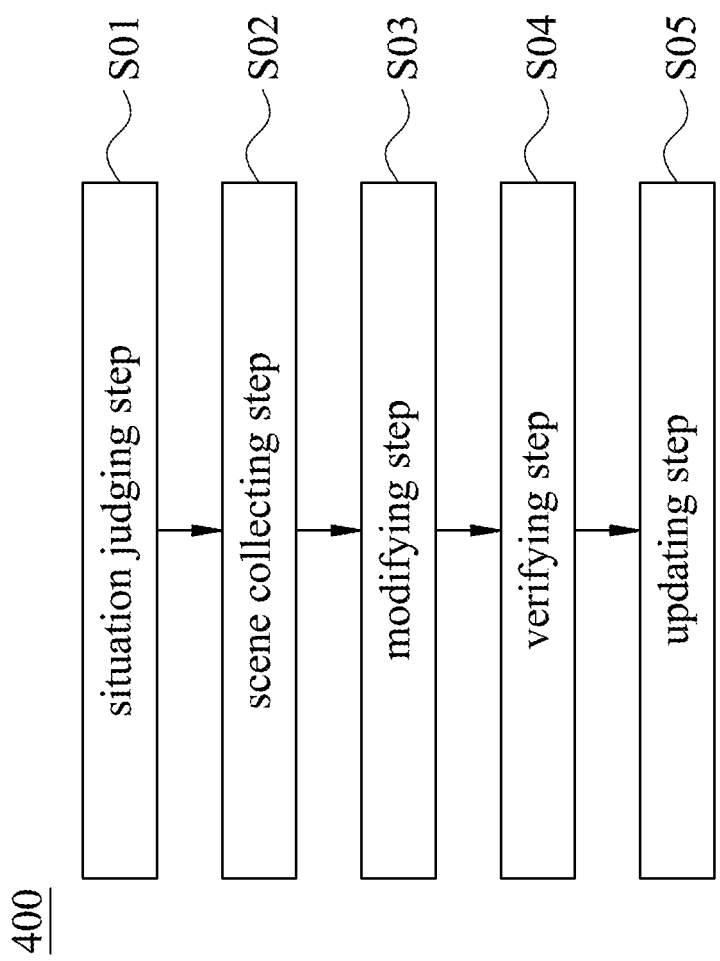
FIG. 2 shows a schematic flow chart of a method with a SOTIF scene collection and a self-update mechanism according to a second embodiment.

FIG. 2 shows a schematic flow chart of a method 400 with a SOTIF scene collection and a self-update mechanism according to a second embodiment. Please refer to FIG. 2 with reference of FIG. 2, a method 400 with the SOTIF scene collection and the self-update mechanism is applied to a vehicle 110, and includes a situation judging step S01 including configuring a self-driving system 200 to judge whether a sensing control dataset generated by the sensor 210 and the controller 220 belongs to one of an unexpected intervention dataset and an accident scene dataset to generate a situation judgment result, a scene collecting step S02 including configuring the self-driving system 200 to collect the sensing control dataset to establish a scene database according to the situation judgment result, a modifying step S03 including configuring the self-driving system 200 to modify an algorithm of the sensor 210 and the controller 220 according to the scene database, a verifying step S04 including configuring one of the self-driving system 200 and the cloud platform 300 to perform a parallel calculation on the sensor 210 and the controller 220 that are modified to generate a verification output command and to compare the verification output command with a driver intervention control command to generate a comparison result, and an updating step S05 including configuring the aforementioned one of the self-driving system 200 and the cloud platform 300 to update the algorithm of the sensor 210 and the controller 220 according to the comparison result, thereby allowing an updated output command generated by the sensor 210 and the controller 220 that are updated to correspond to the driver intervention control command. As the situation judging step S01 judges that the sensing control dataset belongs to the accident scene dataset, the sensing control dataset collected by the scene collecting step S02 belongs to a SOTIF scene.

Therefore, the system 100 and the method 400 can perform collection of scenes of the unexpected intervention or current accidents to establish the scene database, and then perform comparisons and tests to separate the safety of the functionality or the safety of the intended functionality (SOTIF), provide suggestions of the abnormal functionality points, scenes, and dataset records of the sensor 210 and the controller 220 of the abnormal functionality points. Then the verifying step S04 can perform the detection of the signals and the confirmation of the responds of the controller 220, and performs final system operation confirmation to confirm the verification comparison result, thereby increasing the stability and application of the system 100 and the method 400 to increase the marketing.

Figure 3:
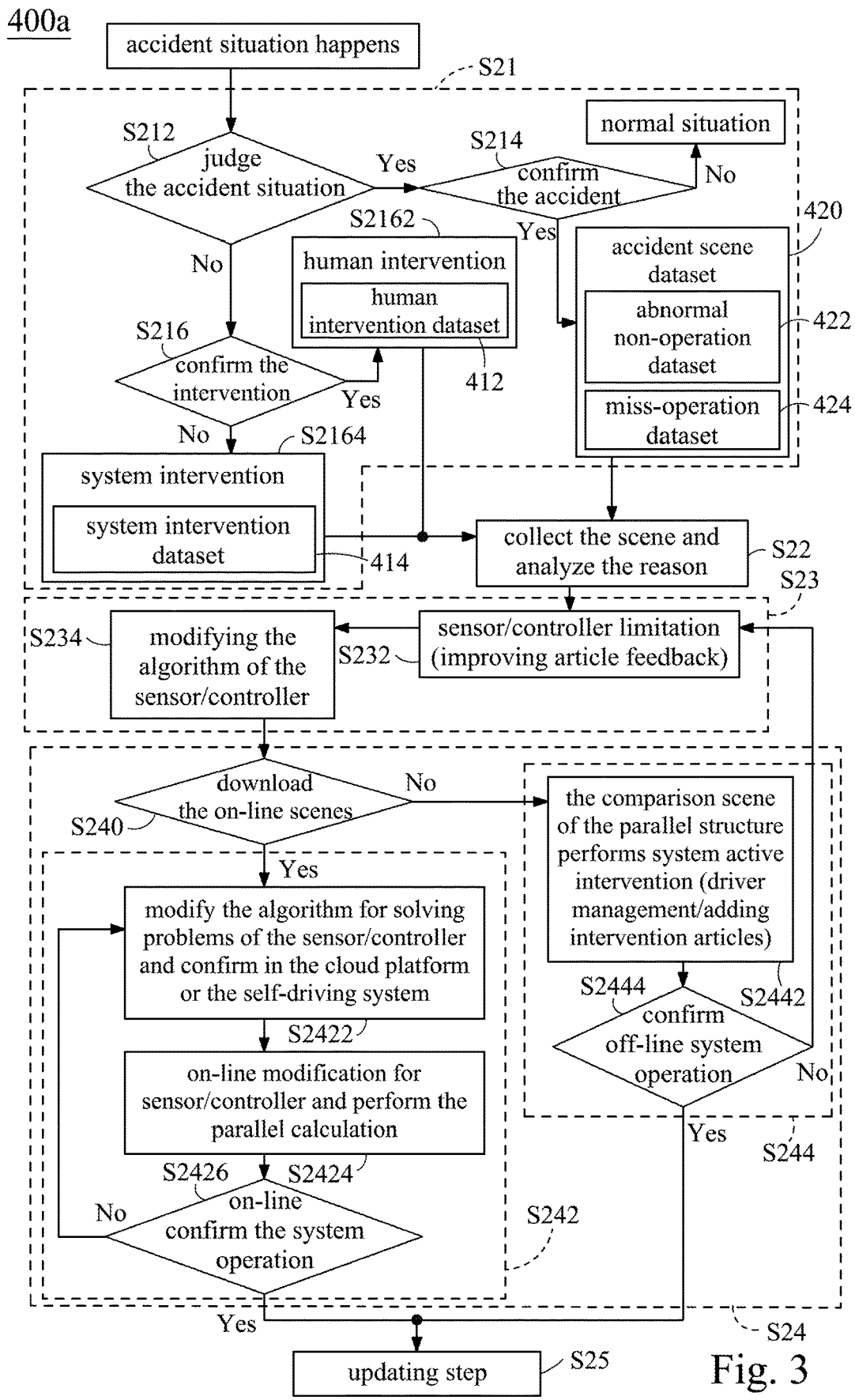
FIG. 3 shows a flow chart of a method with a SOTIF scene collection and a self-update mechanism according to a third embodiment.
Figure 4:
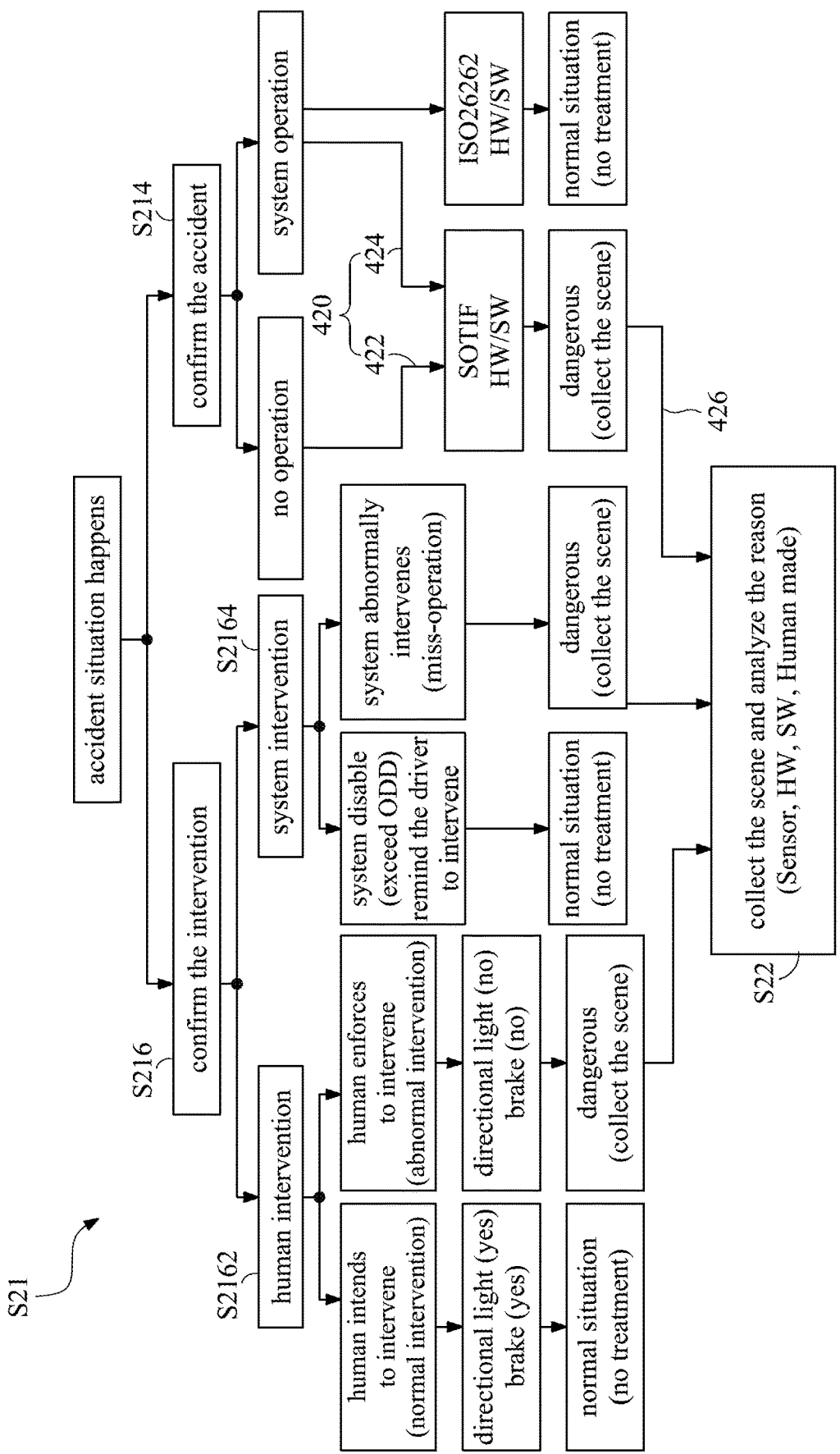
FIG. 4 shows a flow chart of a situation judging step and a scene collecting step of FIG. 3.

FIG. 3 shows a flow chart of a method 400a with a SOTIF scene collection and a self-update mechanism according to a third embodiment. FIG. 4 shows a flow chart of a situation judging step S21 and a scene collecting step S22 of FIG. 3. Please refer to FIGS. 3 and 4 with references of FIGS. 1 and 2, the method 400a with the SOTIF scene collection and the self-update mechanism is applied to a vehicle 110 and includes a situation judging step S21, a scene collecting step S22, a modifying step S23, a verifying step S24 and an updating step S25. The situation judging step S21 includes an accident situation judging step S212, an accident confirming step S214, an intervention confirming step S216, a human unexpected intervention judging step S2162 and a system unexpected intervention judging step S2164. The accident situation judging step S212 is "judge the accident situation" and includes configuring the self-driving system 200 to judge whether the sensing control dataset belongs to an accident operation dataset to generate an accident situation judging result and to perform one of the accident confirming step S214 and the intervention confirming step S216 according to the accident situation judging result. As the accident situation judging result is yes, the self-driving system 200 performs the accident confirming step S214; as accident situation judging result is no, the self-driving system 200 performs the intervention confirming step S216. In one embodiment, the accident operation dataset may include at least one of an airbag operation dataset, an acceleration sensor sensing dataset and a sensor failure dataset. The airbag operation dataset represents the dataset generated as the airbag of the vehicle 110 deploys, the acceleration sensor sensing dataset represents the dataset generated as the G-sensor operates (especially the sensing value exceeds a predetermined value), and the sensor failure dataset represents the dataset generated as the sensor 210 fails, but the present disclosure is not limited thereto.

The accident confirming step S214 is "confirm the accident", and includes configuring the self-driving system 200 to confirm whether the sensing control dataset belongs to the accident scene dataset 420 to generate an accident confirming result. As the accident confirming result is yes, the self-driving system 200 performs the scene collecting step S22. As the accident confirming result is no, the self-driving system 200 stops the current scene collection and self-update. Precisely, the accident scene dataset 420 includes an abnormal non-operation dataset 422 and a miss-operation dataset 424. The abnormal non-operation dataset 422 represents the dataset generated as the self-driving system 200 does not operate in a situation that the self-driving system 200 needs to operate. The miss-operation dataset 424 represents the dataset generated as the self-driving system 200 operates in a situation that the self-driving system 200 does not need to operate, which may be caused by abnormal commands from the controller 220. As the accident confirming result is yes, the sensing control dataset belongs to one of the abnormal non-operating dataset 422 and the miss-operation dataset 424. Since the unexpected accident is dangerous, the self-driving system 200 will perform the scene collecting step S22. On the contrary, as the accident confirming result is no, the sensing control dataset does not belong to the abnormal non-operating dataset 422 and the miss-operation dataset 424, which means that the controller 220 operates normally, and the standard of ISO26262 is satisfied. Since the expected accident is normal and no further confirmation is required, the self-driving system 200 stops the current scene collection and self-update.

The intervention confirming step S216 is "confirm the intervention", and includes configuring the self-driving system 200 to confirm whether the sensing control dataset belongs to a human intervention dataset 412 or a system intervention dataset 414 to generate an intervention confirming result. One of a human unexpected intervention judging step S2162 and a system unexpected intervention judging step S2164 is performed according to the intervention confirming result. As the intervention confirming result is that the sensing control dataset belongs to the human intervention dataset 412, the self-driving system 200 performs the human unexpected intervention judging step S2162; as the intervention confirming result is that the sensing control dataset belongs to the system intervention dataset 414, the self-driving system 200 performs the system unexpected intervention judging step S2164. Precisely, the human intervention dataset 412 includes at least one of a braking operation dataset, an electric/throttle switching on dataset, a steering wheel operation dataset and an emergency button operation dataset. The braking operation dataset represents the dataset generated as the brake is operated, the electric/throttle switching on dataset represents the dataset generated as the throttle turned on or the electric stars, the steering wheel operation dataset represents the dataset generated as the steering wheel operates, e.g., rotating, and the emergency button operation dataset represents the dataset generated as the emergency button is operated. The system intervention dataset 414 includes at least one of a system informing dataset, a system enforcement dataset and a system failure dataset. The system informing dataset represents informing datasets sent by the self-driving system 200, the system enforcement dataset represents the dataset generated as the enforcement of the self-driving system 200 is taken, the system failure dataset represents the dataset generated as being out of the controllable range of the self-driving system 200. In addition, the human unexpected intervention judging step S2162 is "human intervention", and includes configuring the self-driving system 200 to judge whether the sensing control dataset belongs to a human unexpected intervention dataset to generate a human unexpected intervention judging result. The system unexpected intervention judging step S2164 is "system intervention", and includes configuring the self-driving system 200 to judge whether the sensing control dataset belongs to a system unexpected intervention dataset to generate a system unexpected intervention judging result. As one of the human unexpected intervention judging result and the system unexpected intervention judging result is yes, the self-driving system 200 performs the scene collecting step S22. The unexpected intervention dataset includes the human unexpected intervention dataset and the system unexpected intervention dataset.

As in the human unexpected intervention judging step S2162 the human unexpected intervention judging result is yes, indicating the sensing control dataset belongs to the human unexpected intervention dataset, the self-driving system 200 judges that a forced invention of the driver occurs, that is, an abnormal intervention. For example, as the directional light is not operated and the brake is not operated while the steering wheel is rotating, the unexpected intervention is dangerous. Hence, the self-driving system 200 will perform the scene collecting step S22, and the self-driving system 200 can be updated through the latter modifying step S23, the verifying step S24 and the updating step S25 to include this kind of dangerous scene. In the example, the sensing control dataset includes the directional light non-operation dataset, the brake non-operation dataset and the steering wheel operation dataset, and the human unexpected intervention dataset includes the directional light non-operation dataset, the brake non-operation dataset and the steering wheel operation dataset.

In the human unexpected intervention judging step S2162, as the human unexpected intervention judging result is no, which represents the sensing control dataset does not belong to the human unexpected intervention dataset, the self-driving system 200 judges that the driver intends to intervene, that is, a normal intervention. For example, as the directional light is operated and the brake is operated while the steering wheel is rotating, this kind of expected intervention belongs to a normal situation and no action is required, and the self-driving system 200 stops the current scene collection and self-update. In the example, the sensing control dataset includes the directional light operation dataset, the brake operation dataset and the steering wheel operation dataset, and the human unexpected intervention dataset includes the directional light operation dataset, the brake operation dataset and the steering wheel operation dataset.

In the system unexpected intervention judging step S2164, as the system unexpected intervention judging result is yes, indicating the sensing control dataset belongs to the system unexpected intervention dataset, the self-driving system 200 judges that the system abnormally intervenes, that is, miss operation. For example, as the miss operation of the self-driving system 200 occurs, this kind of unexpected intervention is dangerous. The self-driving system 200 performs the scene collecting step S22, and the self-driving system 200 is updated through the latter modifying step S23, the verifying step S24 and the updating step S25. In the example, the sensing control dataset includes the miss-operation dataset, and the system unexpected intervention dataset includes the miss-operation dataset.

As in the system unexpected intervention judging step S2164, the system unexpected intervention judging result is no, indicating the sensing control dataset does not belong to the system unexpected intervention dataset, the self-driving system 200 judges that the system is disabled, that is, exceeding the operational design domain (ODD). For example, as the self-driving system 200 is disabled, this kind of expected intervention belongs to a normal situation and no action is required, and the self-driving system 200 stops the current scene collection and self-update. In the example, the sensing control dataset includes the system disabling dataset, and the system unexpected intervention dataset includes system disabling dataset.

The scene collecting step S22 is "collect the scene and analyze the reason", and includes configuring the self-driving system 200 to collect the sensing control dataset to establish the scene database according to the situation judgment result. As the situation judging step S21 judges that the sensing control dataset belongs to the accident scene dataset 420, the sensing control dataset collected by the scene collecting step S22 belongs to a SOTIF scene 426. In addition, the scene collecting step S22 analyzes the reasons (Sensor, HW, SW Human made) of the scenes in the scene database for latter judgment. The term "Sensor" represents the reason caused by the sensor 210, the term "HW" represents the reason caused by the hardware, and the term "SW" represents the reason caused by the software.

The modifying step S23 includes configuring the self-driving system 200 to modify the algorithm of the sensor 210 and the controller 220 according to the scene database. Precisely, the modifying step S23 includes an improving article feedback step S232 and an algorithm modifying step S234. The improving article feedback step S232 is "sensor/controller limitation (improving article feedback)". The improving article feedback step S232 includes sending the improving article feedback dataset of the sensor 210 or the controller 220 back to the manufactures, i.e., manufacturing end, to allow the manufactures to preform modification according to the improving article feedback dataset. The algorithm modifying step S234 is "modifying the algorithm of the sensor/controller" and includes modifying the algorithm of the sensor 210 and the controller 220 according to the scene database and the improving article feedback dataset. The improving article feedback step S232 and the algorithm modifying step S234 can solve the problems caused by the limitation of the sensor 210 or the controller 220.

The verifying step S24 includes configuring one of the self-driving system 200 and the cloud platform 300 to perform a parallel calculation on the sensor 210 and the controller 220 that are modified to generate a verification output command and to compare the verification output command with a driver intervention control command to generate a comparison result. Precisely, the verifying step S24 includes Step S240. Step S240 is "download the on-line scenes", and includes configuring the aforementioned one of the self-driving system 200 and the cloud platform 300 to judge whether to perform an operation of an on-line scene downloading and to generate an on-line scene downloading confirming result. Subsequently, Step S240 configures the aforementioned one of the self-driving system 200 and the cloud platform 300 to perform one of an on-line verification S242 and an off-line verification S244 to generate the verification output command and the comparison result according to the on-line scene downloading confirming result. As the on-line scene downloading confirming result is yes, the aforementioned one of the self-driving system 200 and the cloud platform 300 performs the on-line verification S242. As the on-line scene downloading confirming result is no, the aforementioned one of the self-driving system 200 and the cloud platform 300 performs the off-line verification S244.

The updating step S25 includes configuring the aforementioned one of the self-driving system 200 and the cloud platform 300 to update the algorithm of the sensor 210 and the controller 220 according to the comparison result, thereby allowing an updated output command generated by the sensor 210 and the controller 220 that are updated to correspond to the driver intervention control command.

Therefore, the method 400a can perform collections of the unexpected intervention scenes (human intervention or system intervention) or the current accident scenes to establish the scene database through the self-driving system 200, and then performs comparisons and tests to separate the safety of the functionality or the safety of the intended functionality, provide suggestions of the abnormal functionality points, scenes, and dataset records of the sensor 210 and the controller 220. Then the verifying step S24 can perform the detection of the signals and the confirmation of the responds of the controller 220, and performs final system operation confirmation to confirm the verification comparison result, thereby increasing the stability and application thereof to increase the marketing.

Figure 5:
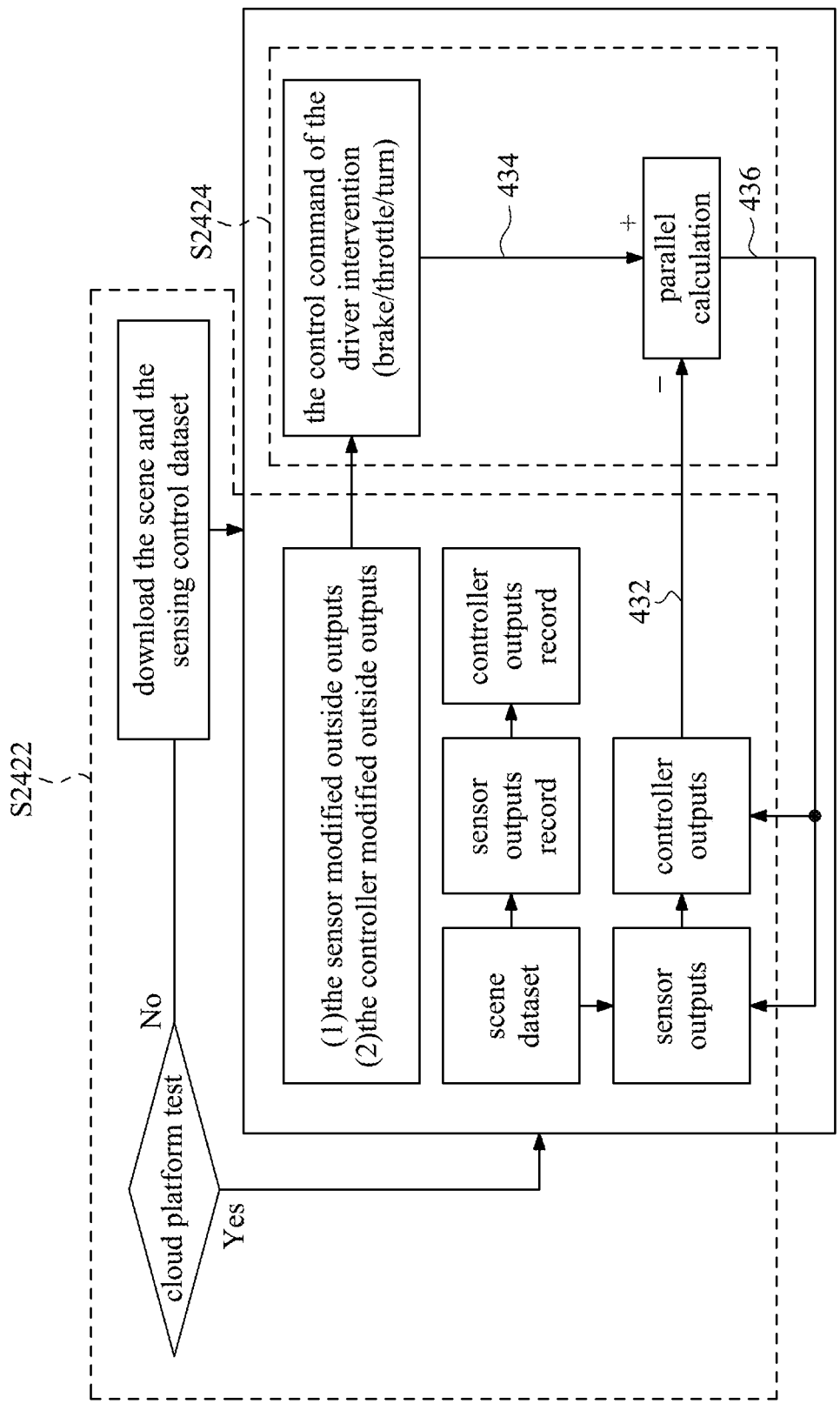
FIG. 5 shows a flow chart of an on-line verification of FIG. 3.

FIG. 5 shows a flow chart of an on-line verification S242 of FIG. 3. Please refer to FIG. 5 with references of FIGS. 1 to 4, in the verifying step S24, the cloud platform 300 stores a predetermined number and another scene database, the aforementioned one of the self-driving system 200 and the cloud platform 300 is configured to perform the on-line verification S242, and the on-line verification S242 includes an on-line modifying step S2422, an on-line calculating step S2424, and an on-line system operation confirming step S2426. The on-line modifying step S2422 includes judging whether the cloud platform 300 performs the test, and the aforementioned one of the self-driving system 200 and the cloud platform 300 will be the cloud platform 300 if being yes. Otherwise, the aforementioned one of the self-driving system 200 and the cloud platform 300 will be the self-driving system 200 if not, and the self-driving system 200 will download the scene and the s sensing control dataset to establish another sense database. The on-line modifying step S2422 can further include configuring the aforementioned one of the self-driving system 200 and the cloud platform 300 to modify the algorithm of the sensor 210 and the controller 220 according to scene database and the aforementioned another database, and then the verification output command 432 is generated by performing the algorithm. Moreover, the on-line calculating step S2424 includes configuring the aforementioned one of the self-driving system 200 and the cloud platform 300 to perform the parallel calculation on the sensor 210 and the controller 220 that are modified in the on-line modifying step S2422 to generate the on-line verification comparing result 436, and the parallel calculation includes comparing the verification output command 432 and the driver intervention control command 434. The on-line system operation confirming step S2426 includes configuring the aforementioned one of the self-driving system 200 and the cloud platform 300 to confirm whether the aforementioned one of the self-driving system 200 and the cloud platform 300 to confirm whether to perform the updating step S25 according to an on-line verification comparing result 436. The updating step S25 can be performed if yes; otherwise, repeating the on-line modifying step S2422. The scene database and the aforementioned another scene database includes scene datasets corresponding to the output records of the sensor 210 and the controller 220.

The verification output command 432 corresponds to outputs of the sensor 210 and the controller 220. The driver intervention control command 434 represents the control command generated as the driver intervenes in a condition employing the modified sensor 210 and the controller 220 (corresponding to the output of the sensor 210 that is modified outside and the output of the controller 220 that is modified outside), and includes a brake command, an accelerator command or a turning command.

Figure 6:
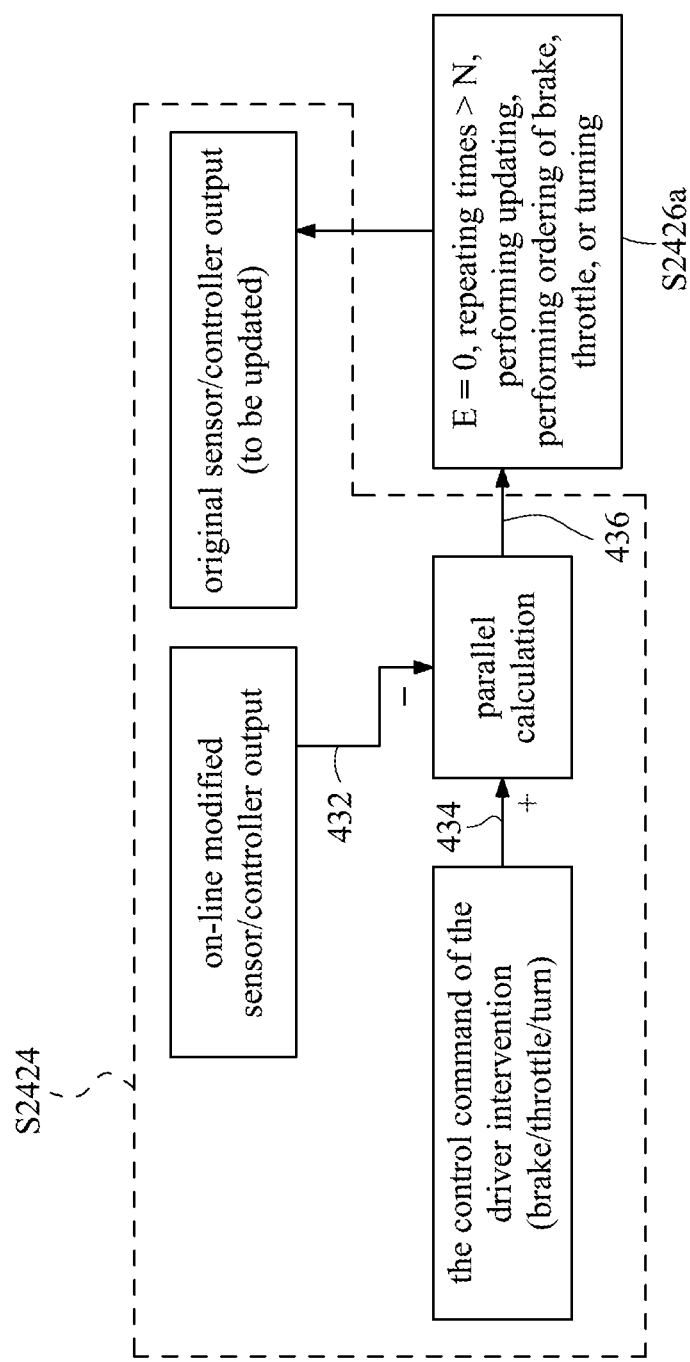
FIG. 6 shows a schematic view of a first example of the on-line verification of FIG. 3.

FIG. 6 shows a schematic view of a first example of the on-line verification S242 of FIG. 3. Please refer to FIG. 6 with references of FIGS. 1 to 5. The on-line verification S242 includes the on-line calculating step S2424 and the on-line system operation confirming step S2426a. The on-line calculating step S2424 is identical to the on-line calculating step S2424 in FIG. 3 and will not be repeated. In addition, the on-line system operation confirming step S2426a is that "E=0, repeating times >N, performing updating, performing ordering of brake, throttle, or turning", and includes configuring the aforementioned one of the self-driving system 200 and the cloud platform 300 to confirm whether to operate the updating step S25 according to the on-line verification comparing result 436. Precisely, as the on-line verification comparing result 436 of the on-line system operation confirming step S2426a is a predetermined identical result, perform the updating step S25 (updating the output of the original sensor 210 and the controller 220). On the contrary, as the on-line verification comparing result 436 of the on-line system operation confirming step S2426a is not the predetermined identical result, repeat the on-line modifying step S2422, the on-line calculating step S2424 and the on-line system operation confirming step S2426a. The predetermined identical result is that the verification output command 432 is identical to the driver intervention control command 434 (E=0) and the verification output command 432 keeps being identical to the driver intervention control command 434 for a number of times that is greater than the predetermined number (N). In one embodiment, N can be set to 3, but the present disclosure is not limited thereto.

For example, in a situation that there is no accident, as the vehicle 110 is on the high speed way and meets an obstacle vehicle in the front, a to-be-updated output, which is used for comparison and is not the real command outputting to the vehicle 110, will correspond to brake/stop that is modified on-line, or correspond to intervention that is self-updated off-line. The parallel calculation will compare the to-be-updated output, i.e., the verification output command 432, and the final output command of the vehicle 110, i.e., the driver intervention control command 434. If both commands match each other, indicating that the on-line verification comparing result 436 is that the verification output command 432 is equal to the driver intervention control command 434, and the same result is repeated for specific times, that is, a number of the repeating times being larger than the predetermined number, the updating step S25 is performed.

Figure 7:
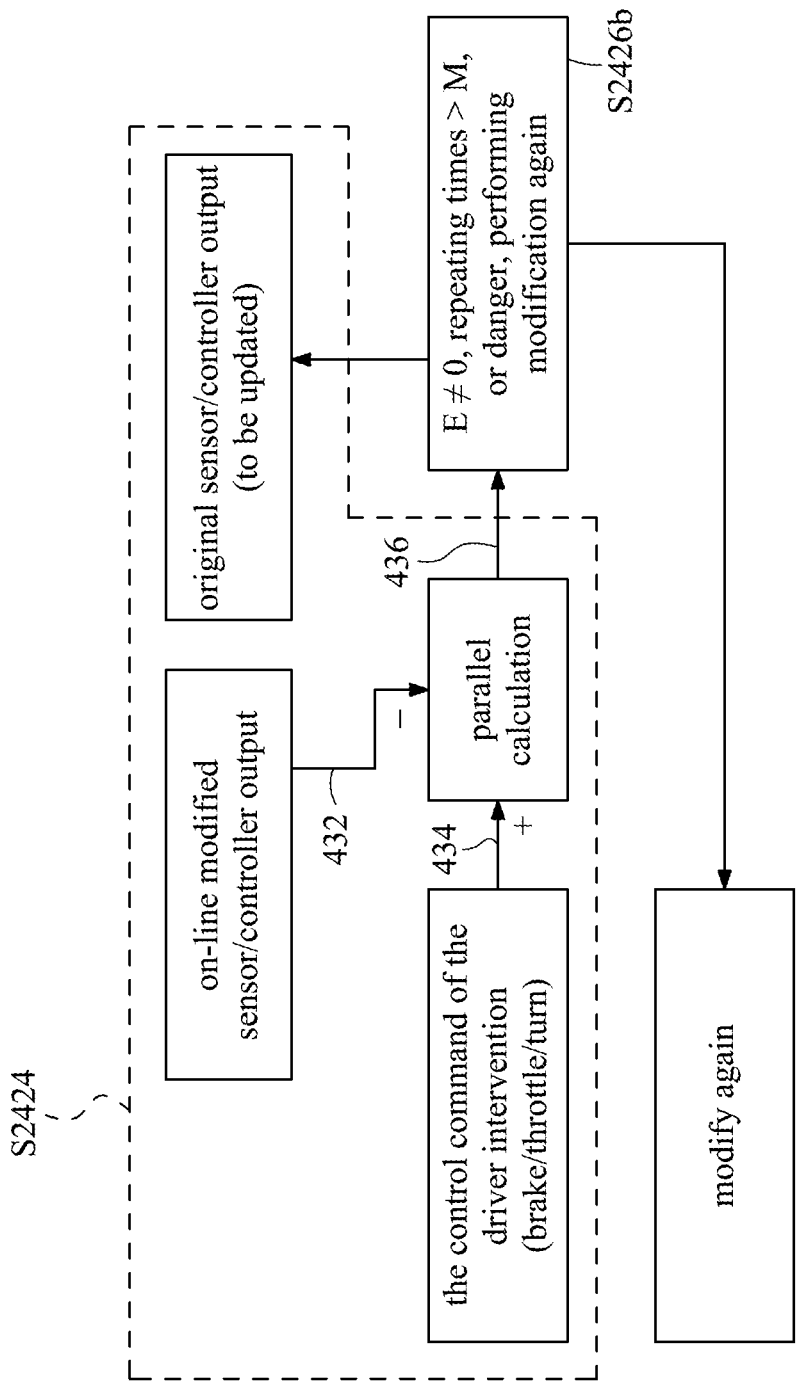
FIG. 7 shows a schematic view of a second example of the on-line verification of FIG. 3.

FIG. 7 shows a schematic view of a second example of the on-line verification S242 of FIG. 3. Please refer to FIG. 7 with references of FIGS. 1 to 6. The on-line verification S242 includes the on-line calculating step S2424 and an on-line system operation confirming step S2426b. The on-line calculating step S2424 is identical to the on-line calculating step S2424 in FIG. 6, and will not be repeated. In addition, the on-line system operation confirming step S2426b is "E≠0, repeating times >M, or danger, performing modification again", and includes configuring the aforementioned one of the self-driving system 200 and the cloud platform 300 to confirm whether to operate the updating step S25 according to the on-line verification comparing result 436. Precisely, as the on-line verification comparing result 436 of the on-line system operation confirming step S2426b is a predetermined different result, repeat the on-line modifying step S2422, and then perform the updating step S25. On the contrary, as the on-line verification comparing result 436 of the on-line system operation confirming step S2426*b* is not the predetermined different result, repeat the on-line modifying step S2422, the on-line calculating step S2424 and the on-line system operation confirming step S2426*b*. The predetermined different result is that the verification output command 432 is different from the driver intervention control command 434 and the verification output command 432 keeps being different from the driver intervention control command 434 for a number of times that is greater than the predetermined number (M). In one embodiment, M can be set to 1, but the present disclosure is not limited thereto.

Figure 8:
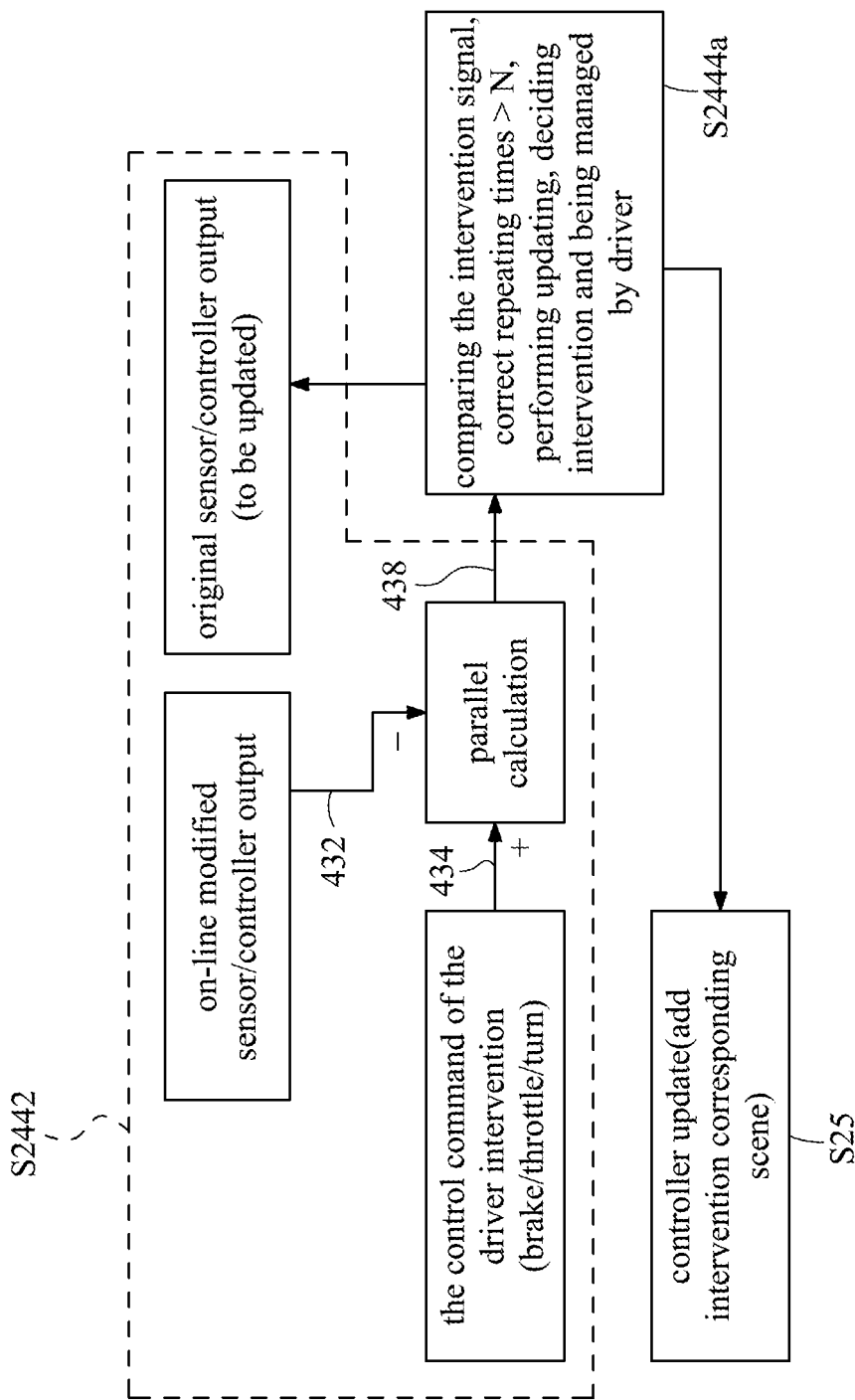
FIG. 8 shows a schematic view of a first example of an off-line verification of FIG. 3.
Figure 9:
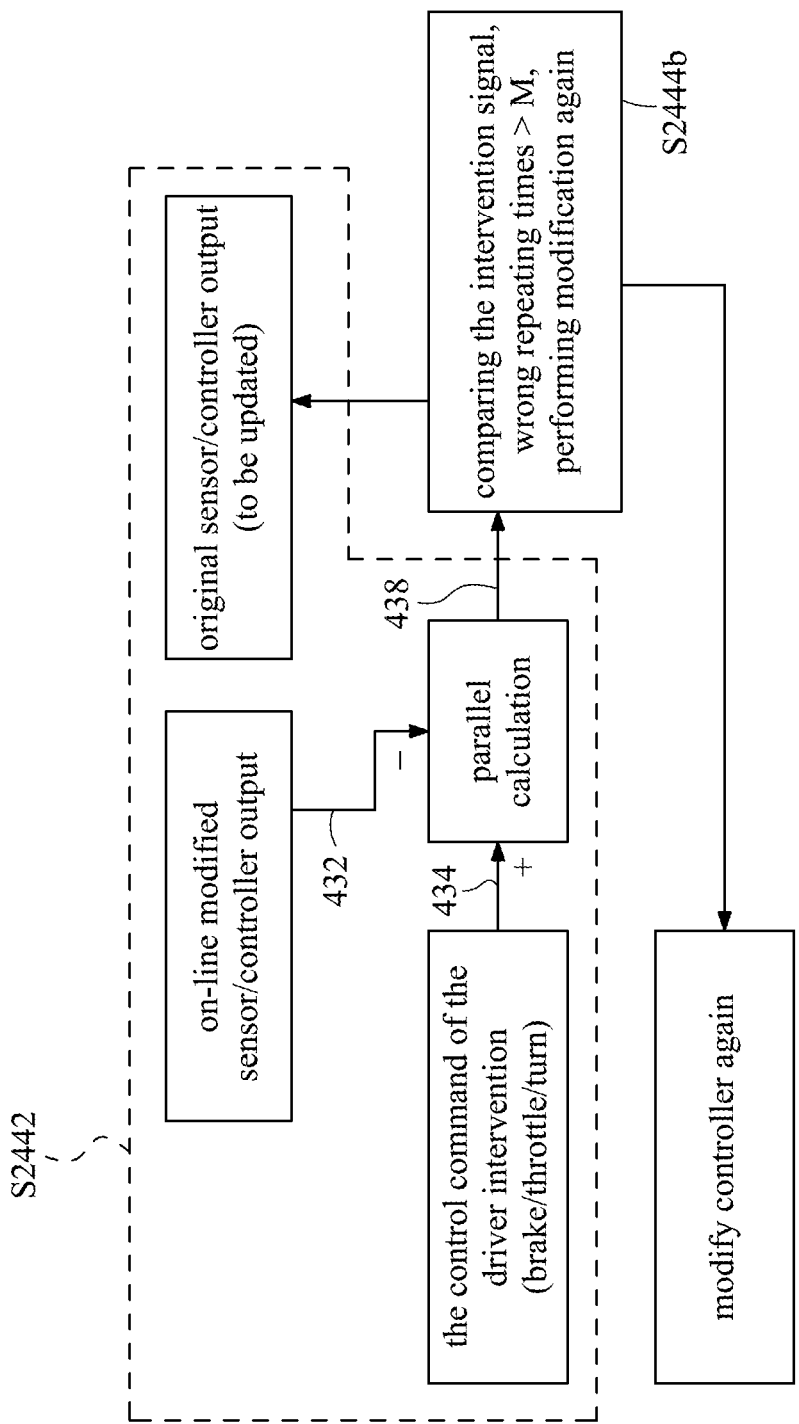
FIG. 9 shows a schematic view of a second example of the off-line verification of FIG. 3.

FIG. 8 shows a schematic view of a first example of an off-line verification S244 of FIG. 3. FIG. 9 shows a schematic view of a second example of the off-line verification S244 of FIG. 3. Please refer to FIGS. 8 and 9 with references of FIGS. 1 to 7. The self-driving system 200 stores a predetermined number and is configured to perform an off-line verification S244. The off-line verification S244 includes an off-line calculating step S2442 and an off-line system operation confirming step S2444. The off-line calculating step S2442 is "the comparison scene of the parallel structure performs system active intervention (driver management/adding intervention articles)", and includes configuring the self-driving system 200 to perform the algorithm of the sensor 210 and the controller 220 that are modified in the modifying step S23 to generate the verification output command 432, and after that performs the parallel calculation to generate the off-line verification comparing result 438. The parallel calculation includes comparing the verification output command 432 and the driver intervention control command 434. The off-line system operation confirming step S2444 includes configuring the self-driving system 200 to confirm whether to perform the updating step S25 according to the off-line verification comparing result 438.

In the first example of FIG. 8, the off-line verification S244 includes the off-line calculating step S2442 and the off-line system operation confirming step S2444*a*. The off-line system operation confirming step S2444*a* is that "comparing the intervention signal, correct repeating times >N, performing updating, deciding intervention and being managed by driver", and includes configuring the self-driving system 200 to confirm whether to operate the updating step S25 according to the off-line verification comparing result 438. Precisely, as the off-line verification comparing result 438 of the off-line system operation confirming step S2444*a* is a predetermined identical result, perform the updating step S25. On the contrary, as the off-line verification comparing result 438 of the off-line system operation confirming step S2444*a* is not the predetermined identical result, repeat the modifying step S23 and the verifying step S24. The predetermined identical result is that the verification output command 432 is identical to the driver intervention control command 434 and the verification output command 432 keeps being identical to the driver intervention control command 434 for a number of times that is greater than the predetermined number (N).

In the second example of FIG. 9, the off-line verification S244 includes the off-line calculating step S2442 and the off-line system operation confirming step S2444*b*. The off-line system operation confirming step S2444*b* is that "comparing the intervention signal, wrong repeating times >M, performing modification again", and includes configuring the self-driving system 200 to confirm whether to operate the updating step S25 according to the on-line verification comparing result 436. Precisely, as the off-line verification comparing result 438 of the off-line system operation confirming step S2444*b* is a predetermined different result, repeat the modifying step S23, and then perform the updating step S25. On the contrary, as the off-line system operation confirming step S2444*b* of the off-line system operation confirming step S2444*b* is not the predetermined different result, repeat the modifying step S23 and the verifying step S24. The predetermined different result is that the verification output command 432 is different from the driver intervention control command 434 and the verification output command 432 keeps being different from the driver intervention control command 434 for a number of times that is greater than the predetermined number (M).

It is known from FIGS. 3 and 5-9, the comparison result of the verifying step S24 is one of the on-line verification comparing result 436 and the off-line verification comparing result 438. The driver intervention control command 434 corresponds to at least one of a braking operation dataset, an electric/throttle switching on dataset, a steering wheel operation dataset and an emergency button operation dataset.

Figure 10:
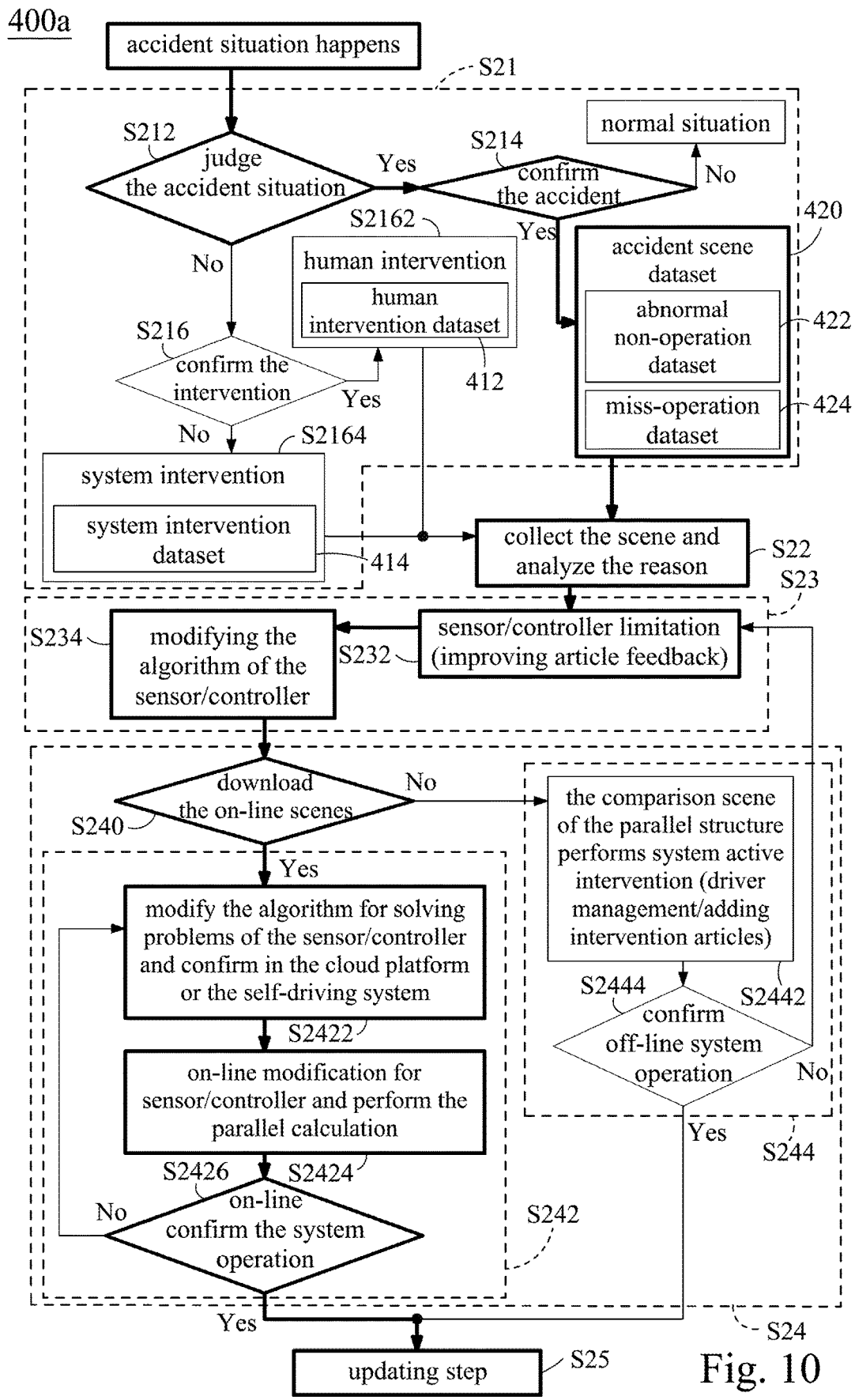
FIG. 10 shows a flow chart of the method of FIG. 3 as being applied to an accident situation.
Figure 11:
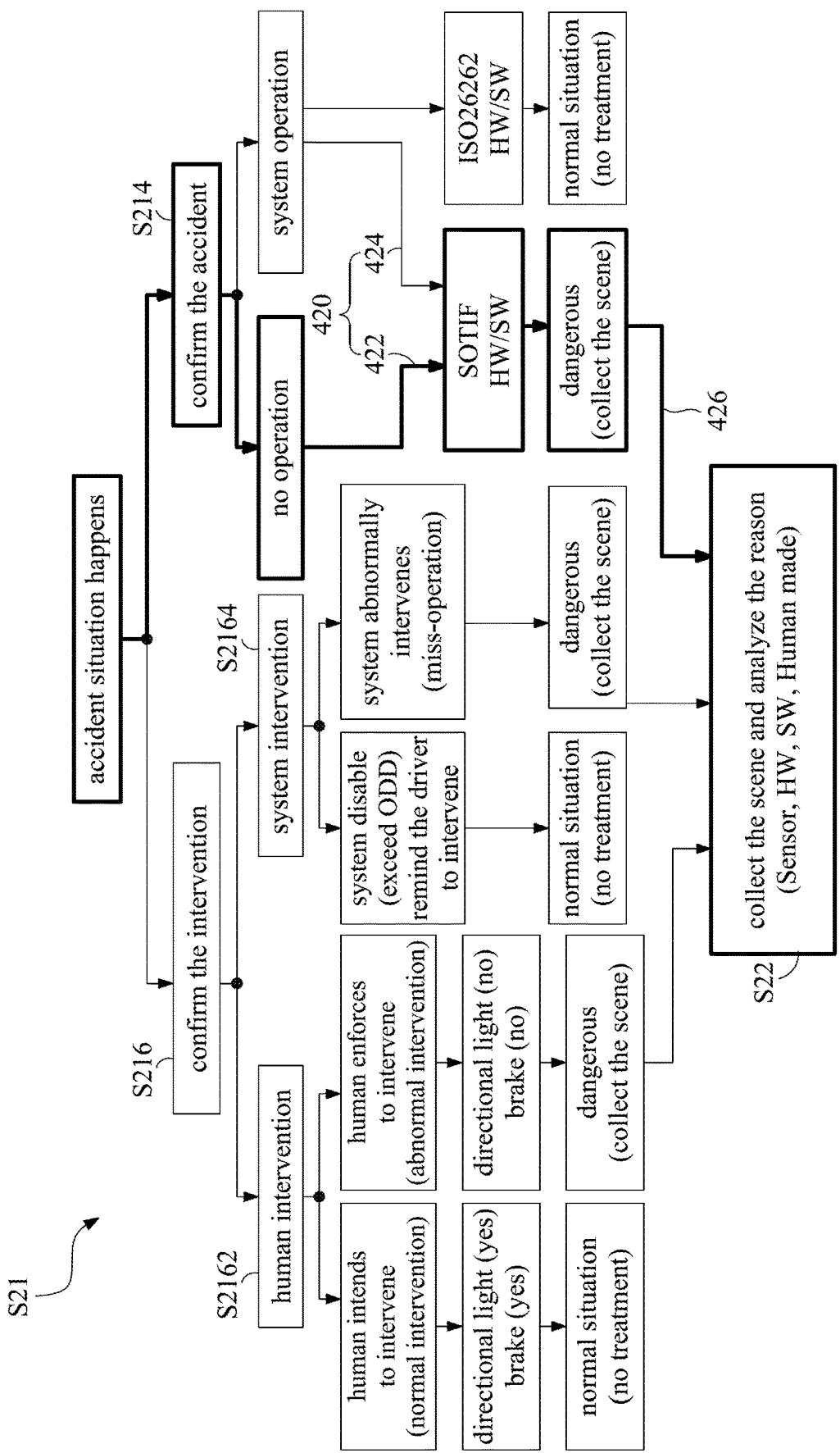
FIG. 11 shows a flow chart of the situation judging step and the scene collecting step of FIG. 4 as being applied to an accident situation.

FIG. 10 shows a flow chart of the method 400*a* of FIG. 3 as being applied to an accident situation. FIG. 11 shows a flow chart of the situation judging step S21 and the scene collecting step S22 of FIG. 4 as being applied to an accident situation. Please refer to FIGS. 10 and 11 with references of FIGS. 1, 3 and 4, the method 400*a* is applied to the vehicle 110 and the system 100. The system 100 includes the self-driving system 200 and the cloud platform 300, and the self-driving system 200 is ADS. An accident occurs on the vehicle 110, in which the vehicle 110 hits the splitter island, the splitter island engages with the engine, the self-driving system 200 does not operate in a situation that the self-driving system 200 needs to operate, i.e., braking should be operated but not being operated, and the abnormal non-operation dataset 422 is generated. As the accident situation happens, the method 400*a* performs the accident situation judging step S212 of the situation judging step S21, the accident confirming step S214, the scene collecting step S22, the modifying step S23, Step 240 of the verifying step S24, the on-line verification S242 and the updating step S25, as shown in the thickened block and thickened line. In the situation judging step S21, as the accident confirming result is yes, the sensing control dataset belongs to the abnormal non-operation dataset 422. This kind of unexpected accident is dangerous, and the self-driving system 200 will perform the scene collecting step S22, and the sensing control dataset collected in the scene collecting step S22 belongs to the SOTIF scene 426. In Step 240, as the on-line scene downloading confirming result is yes, the cloud platform 300 performs the on-line verification S242.

Therefore, the system 100 and the method 400*a* can perform collection of scene of the unexpected intervention (human intervention or system intervention) or current accidents to establish the scene database via the self-driving system 200, and then perform comparisons and tests to separate the safety of the functionality or the safety of the intended functionality, provide suggestions, scenes, dataset records of the sensor 210 and the controller 220 of the abnormal functionality points. Then the verifying step S24 can perform the detection of the signals and the confirmation of the responds of the controller 220, and performs final system operation confirmation to confirm the verification comparison result, thereby increasing the stability and application of the system 100 and the method 400*a* to increase the marketing. In addition, the present disclosure can solve the problems of the conventional technique, including multi-layer verification, time consuming in the on-line training, consideration of miss-learning from the operation of the driver that has a malicious intention, limitation of the sensor 210 that cannot be solved by learning, a lack of off-line updating, and complex on-line learning.

It is known that, the methods 400, 400a can be carried out on a computer program-based product. The operating sequences of the steps of the above embodiments can be changed, combined or omitted based on the real demands. The above embodiment can be carried out on the computer program-based product which can include a machine readable medium that stores lots of instructions, and the computer is programing by the instructions to carry out the steps in the above embodiments. The machine readable medium can be, but not limited, a floppy disk, an optical disc (OD), a read-only optical disc, a magneto-optical disc (MO disc), a read-only memory (ROM), a random access memory (RAM), an erasable programmable read-only memory (EPROM), an electrically-erasable programmable read-only memory (EEPROM), an optical card or a magnetic card, a flash memory, or other machine readable mediums that can be suitable for storing digital instructions. Moreover, the embodiment of the present disclosure be made to a computer-based product which can be downloaded, and the computer-based product of the present disclosure can be transfers to the requested computer from a remote computer via the data signal of the communication connection, e.g., internet connection.

Based on the above embodiment, it is known that the present disclosure includes the flowing advantages. 1. With the self-driving system preforming the collection of scene of the unexpected intervention or current accidents to establish the scene database, and performing comparisons and tests to separate the safety of the functionality or the safety of the intended functionality, providing suggestions, scenes, dataset records of the sensor and the controller of the abnormal functionality points, preforming the verifying step for the detection of the signals and the confirmation of the responds of the controller, and performing final system operation confirmation to confirm the verification comparison result, the stability and application as well as the marketing of the system and the method can be increased. 2. With collecting the unexpected intervention scene and the accident scene to update the algorithm, the scene that corresponds to the safety scenes that may have be unknown and the scenes that has operation insufficiency, and miss-learning from the operation of the driver that has a malicious intention. 3. If the sensor is verified to have limit functions, only replacing of the sensor is required, and the problem can be solved by the parallel calculation. The safety is high. 4. Updating can be provided after verification and reinforcement of on-line or off-line mechanism. As the updated program is not provided, or the program cannot be updated, a new or modified alarm can remind the driver to intervene in order to avoid collision, and the same dangers can be prevented in the period that is not updated yet. 5. The cloud platform can only perform the collection of the article information, the classification or and the function of playing back the datasets that the algorithm requires, and no more complex on-line learning or updated is required.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A method with a Safety of the Intended Functionality (SOTIF) scene collection and a self-update mechanism, which is applied to a vehicle, the method comprising:
    a situation judging step comprising configuring a self-driving system to judge whether a sensing control dataset generated by a sensor and a controller belongs to one of an unexpected intervention dataset and an accident scene dataset to generate a situation judgment result;
    a scene collecting step comprising configuring the self-driving system to collect the sensing control dataset to establish a scene database according to the situation judgment result;
    a modifying step comprising configuring the self-driving system to modify an algorithm of the sensor and the controller according to the scene database;
    a verifying step comprising configuring one of the self-driving system and a cloud platform to perform a parallel calculation on the sensor and the controller that are modified to generate a verification output command and to compare the verification output command with a driver intervention control command to generate a comparison result; and
    an updating step comprising configuring the one of the self-driving system and the cloud platform to update the algorithm of the sensor and the controller according to the comparison result, thereby allowing an updated output command generated by the sensor and the controller that are updated to correspond to the driver intervention control command;
    wherein as the situation judging step judges that the sensing control dataset belongs to the accident scene dataset, the sensing control dataset collected by the scene collecting step belongs to a SOTIF scene;
    wherein the one of the self-driving system and the cloud platform controls displacement of the vehicle according to the updated output command and the driver intervention control command, and the accident scene dataset comprises:
        a miss-operation dataset representing a dataset generated as the self-driving system operates in a situation that the self-driving system does not need to operate.

2. The method of claim 1, wherein the situation judging step further comprises an accident situation judging step configuring the self-driving system to judge whether the sensing control dataset belongs to an accident operation dataset to generate an accident situation judging result and to perform one of an accident confirming step and an intervention confirming step according to the accident situation judging result;
    wherein as the accident situation judging result is yes, the self-driving system performs the accident confirming step; as the accident situation judging result is no, the self-driving system performs the intervention confirming step.

3. The method of claim 2, wherein,
    the accident confirming step comprises configuring the self-driving system to confirm whether the sensing control dataset belongs to the accident scene dataset to generate an accident confirming result, and as the accident confirming result is yes, the self-driving system performs the scene collecting step; and the intervention confirming step comprises configuring the self-driving system to confirm whether the sensing control dataset belongs to a human intervention dataset or a system intervention dataset to generate an intervention confirming result, and one of a human unexpected intervention judging step and a system unexpected intervention judging step is performed according to the intervention confirming result;

wherein as the intervention confirming result is that the sensing control dataset belongs to the human intervention dataset, the self-driving system performs the human unexpected intervention judging step; as the intervention confirming result is that the sensing control dataset belongs to the system intervention dataset, the self-driving system performs the system unexpected intervention judging step.

4. The method of claim 3, wherein, the human unexpected intervention judging step comprises configuring the self-driving system to judge whether the sensing control dataset belongs to a human unexpected intervention dataset to generate a human unexpected intervention judging result; and the system unexpected intervention judging step comprises configuring the self-driving system to judge whether the sensing control dataset belongs to a system unexpected intervention dataset to generate a system unexpected intervention judging result;

wherein as one of the human unexpected intervention judging result and the system unexpected intervention judging result is yes, the self-driving system performs the scene collecting step.

5. The method of claim 4, wherein, the accident operation dataset comprises at least one of an airbag operation dataset, an acceleration sensor sensing dataset and a sensor failure dataset;

the human intervention dataset comprises at least one of a braking operation dataset, an electric/throttle switching on dataset, a steering wheel operation dataset and an emergency button operation dataset;

the system intervention dataset comprises at least one of a system informing dataset, a system enforcement dataset and a system failure dataset; and the unexpected intervention dataset comprises the human unexpected intervention dataset and the system unexpected intervention dataset.

6. The method of claim 1, wherein the accident scene dataset further comprises:

an abnormal non-operation dataset representing a dataset generated as the self-driving system does not operate in a situation that the self-driving system needs to operate.

7. The method of claim 1, wherein the verifying step further comprises:

configuring the one of the self-driving system and the cloud platform to perform one of an on-line verification and an off-line verification to generate the verification output command and the comparison result, wherein the on-line verification comprises an on-line system operation confirming step comprising configuring the one of the self-driving system and the cloud platform to confirm whether to perform the updating step according to an on-line verification comparing result, and the off-line verification comprises an off-line system operation confirming step comprising configuring the self-driving system to confirm whether to perform the updating step according an off-line verification comparing result;

wherein the comparison result is one of the on-line verification comparing result and the off-line verification comparing result; the driver intervention control command corresponds to at least one of a braking operation dataset, an electric/throttle switching on dataset, a steering wheel operation dataset and an emergency button operation dataset.

8. The method of claim 7, wherein in the verifying step, the cloud platform stores a predetermined number and another scene database, the one of the self-driving system and the cloud platform is configured to perform the on-line verification, and the on-line verification further comprises:

an on-line modifying step comprising configuring the one of the self-driving system and the cloud platform to modify the algorithm of the sensor and the controller according to the scene database and the another scene database, then the verification output command being generated by performing the algorithm that is modified;

an on-line calculating step comprising configuring the one of the self-driving system and the cloud platform to perform the parallel calculation on the sensor and the controller that are modified in the on-line modifying step to generate the on-line verification comparing result, wherein the parallel calculation comprises comparing the verification output command and the driver intervention control command.

9. The method of claim 8, wherein, as the on-line verification comparing result of the on-line system operation confirming step is a predetermined identical result, performing the updating step; and as the on-line verification comparing result of the on-line system operation confirming step is not the predetermined identical result, repeating the on-line modifying step, the on-line calculating step and the on-line system operation confirming step;

wherein the predetermined identical result is that the verification output command is identical to the driver intervention control command and the verification output command keeps being identical to the driver intervention control command for a number of times that is greater than the predetermined number.

10. The method of claim 8, wherein, as the on-line verification comparing result of the on-line system operation confirming step is a predetermined different result, repeating the on-line modifying step and after that performing the updating step; and as the on-line verification comparing result of the on-line system operation confirming step is not the predetermined different result, repeating the on-line modifying step, the on-line calculating step and the on-line system operation confirming step;

wherein the predetermined different result is that that the verification output command is different from the driver intervention control command and the verification output command keeps being different from the driver intervention control command for a number of times that is greater than the predetermined number.

11. The method of claim 7, wherein in the verifying step, the self-driving system stores a predetermined number and is configured to perform the off-line verification, and the off-line verification comprises:

an off-line calculating step comprising configuring the self-driving system to perform the algorithm of the sensor and the controller that are modified in the modifying step to generate the verification output command, after that performing the parallel calculation to generate the off-line verification comparing result, wherein the parallel calculation comprises comparing the verification output command and the driver intervention control command.

12. The method of claim 11, wherein,
as the off-line verification comparing result of the off-line system operation confirming step is a predetermined identical result, performing the updating step; and
as the off-line verification comparing result of the off-line system operation confirming step is not the predetermined identical result, repeating the modifying step and the verifying step;
wherein the predetermined identical result is that the verification output command is identical to the driver intervention control command and the verification output command keeps being identical to the driver intervention control command for a number of times that is greater than the predetermined number.

13. The method of claim 11, wherein,
as the off-line verification comparing result of the off-line system operation confirming step is a predetermined different result, repeating the modifying step and after that performing the updating step; and
as the off-line verification comparing result of the off-line system operation confirming step is not the predetermined different result, repeating the modifying step and the verifying step;
wherein the predetermined different result is that the verification output command is different from the driver intervention control command and the verification output command keeps being different from the driver intervention control command for a number of times that is greater than the predetermined number.

14. A system with a SOTIF scene collection and a self-update mechanism, which is applied to a vehicle, the system comprising:
a self-driving subsystem disposed at the vehicle and comprising a sensor and a controller, the self-driving subsystem being configured to perform the following:
a situation judging step comprising judging whether a sensing control dataset generated by the sensor and the controller belongs to one of an unexpected intervention dataset and an accident scene dataset to generate a situation judgment result;
a scene collecting step comprising collecting the sensing control dataset to establish a scene database according to the situation judgment result;
a modifying step comprising modifying an algorithm of the sensor and the controller according to the scene database;
a verifying step comprising performing a parallel calculation on the sensor and the controller that are modified to generate a verification output command and comparing the verification output command with a driver intervention control command to generate a comparison result; and
an updating step comprising updating the algorithm of the sensor and the controller according to the comparison result, thereby allowing an updated output command generated by the sensor and the controller that are updated to correspond to the driver intervention control command;
wherein as the situation judging step judges that the sensing control dataset belongs to the accident scene dataset, the sensing control dataset collected by the scene collecting step belongs to a SOTIF scene;
wherein the self-driving subsystem controls displacement of the vehicle according to the updated output command and the driver intervention control command, and the accident scene dataset comprises:
a miss-operation dataset representing a dataset generated as the self-driving subsystem operates in a situation that the self-driving subsystem does not need to operate.

15. The system of claim 14, wherein the accident scene dataset further comprises:
an abnormal non-operation dataset representing a dataset generated as the self-driving subsystem does not operate in a situation that the self-driving subsystem needs to operate.

16. The system of claim 14, wherein the driver intervention control command corresponds to at least one of a braking operation dataset, an electric/throttle switching on dataset, a steering wheel operation dataset and an emergency button operation dataset.

17. A system with a SOTIF scene collection and a self-update mechanism, which is applied to a vehicle, the system comprising:
a self-driving subsystem disposed at the vehicle and comprising a sensor and a controller; and
a cloud platform signally connected to the self-driving subsystem;
wherein the self-driving subsystem and the cloud platform are configured to perform the following:
a situation judging step comprising configuring the self-driving subsystem to judge whether a sensing control dataset generated by the sensor and the controller belongs to one of an unexpected intervention dataset and an accident scene dataset to generate a situation judgment result;
a scene collecting step comprising configuring the self-driving subsystem to collect the sensing control dataset to establish a scene database according to the situation judgment result;
a modifying step comprising configuring the self-driving subsystem to modify an algorithm of the sensor and the controller according to the scene database;
a verifying step comprising configuring one of the self-driving subsystem and the cloud platform to perform a parallel calculation on the sensor and the controller that are modified to generate a verification output command and to compare the verification output command with a driver intervention control command to generate a comparison result; and
an updating step comprising configuring the one of the self-driving subsystem and the cloud platform to update the algorithm of the sensor and the controller according to the comparison result, thereby allowing an updated output command generated by the sensor and the controller that are updated to correspond to the driver intervention control command;
wherein as the situation judging step judges that the sensing control dataset belongs to the accident scene dataset, the sensing control dataset collected by the scene collecting step belongs to a SOTIF scene;
wherein the one of the self-driving subsystem and the cloud platform controls displacement of the vehicle according to the updated output command and the driver intervention control command, and the accident scene dataset comprises:
a miss-operation dataset representing a dataset generated as the self-driving subsystem operates in a situation that the self-driving subsystem does not need to operate.

18. The system of claim 17, wherein the accident scene dataset further comprises:

an abnormal non-operation dataset representing a dataset generated as the self-driving subsystem does not operate in a situation that the self-driving subsystem needs to operate.

19. The system of claim 17, wherein the verifying step comprises:

configuring the one of the self-driving subsystem and the cloud platform to perform one of an on-line verification and an off-line verification to generate the verification output command and the comparison result;

wherein the on-line verification comprises an on-line system operation confirming step comprising configuring the one of the self-driving subsystem and the cloud platform to confirm whether to perform the updating step according to an on-line verification comparing result, and the off-line verification comprises an off-line system operation confirming step comprising configuring the self-driving subsystem to confirm whether to perform the updating step according an off-line verification comparing result;

wherein the comparison result is one of the on-line verification comparing result and the off-line verification comparing result; the driver intervention control command corresponds to at least one of a braking operation dataset, an electric/throttle switching on dataset, a steering wheel operation dataset and an emergency button operation dataset.

\* \* \* \* \*